US012567599B2

(12) United States Patent
Babinec et al.

(10) Patent No.: US 12,567,599 B2
(45) Date of Patent: Mar. 3, 2026

(54) LEAD ACID ELECTROCHEMICAL CELLS WITH PUMPED ELECTROLYTES AND METHODS OF MAKING AND USING THE SAME

(71) Applicant: UCHICAGO ARGONNE, LLC, Chicago, IL (US)

(72) Inventors: Susan J. Babinec, Midland, MI (US); Timothy Fister, Oak Park, IL (US); Pietro Papa Lopes, Woodridge, IL (US); Vojislav Stamenkovic, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 188 days.

(21) Appl. No.: 17/566,340

(22) Filed: Dec. 30, 2021

(65) Prior Publication Data

US 2023/0216091 A1      Jul. 6, 2023

(51) Int. Cl.
    *H01M 8/18*      (2006.01)
    *H01M 8/04186*   (2016.01)
    *H01M 10/08*     (2006.01)
(52) U.S. Cl.
    CPC .......... *H01M 8/188* (2013.01); *H01M 10/08* (2013.01); *H01M 8/04186* (2013.01); *H01M 8/18* (2013.01)
(58) Field of Classification Search
    CPC ...... H01M 8/188; H01M 10/44; H01M 10/46; H01M 10/4242; H01M 10/06; H01M 8/04186
    See application file for complete search history.

(56) References Cited

U.S. PATENT DOCUMENTS

| | | | |
|---|---|---|---|
| 3,915,745 A * | 10/1975 | Ikeda | H01M 10/42 |
| | | | 429/406 |
| 5,612,148 A | 3/1997 | Zito | |
| 5,650,239 A | 7/1997 | Lex et al. | |
| 8,048,555 B2 | 11/2011 | Darcy et al. | |
| 9,722,236 B2 | 8/2017 | Sathrum | |

(Continued)

FOREIGN PATENT DOCUMENTS

CN      105845960 A      8/2016

OTHER PUBLICATIONS

International Search Report & Written Opinion on PCT/US2022/053872 dated Apr. 12, 2023, 10 pages.

(Continued)

*Primary Examiner* — Imran Akram
(74) *Attorney, Agent, or Firm* — Foley & Lardner LLP

(57) ABSTRACT

An electrochemical cell assembly includes an electrochemical cell including housing and a negative active material disposed within a first electrode chamber of the housing. The negative active material includes lead. The electrochemical cell further includes a positive active material disposed within a second electrode chamber of the housing and a separator disposed in the housing between the first electrode chamber and the second electrode chamber. The positive active material includes lead and/or lead dioxide. The electrochemical cell assembly further includes a pumping assembly configured to pump a plurality of electrolytes through either the first electrode chamber or the second electrode chamber during operation of the electrochemical cell based on a process of a cell cycle of the electrochemical cell.

7 Claims, 2 Drawing Sheets

100

Provide an electrochemical cell having a positive active material and a negative active material — 102

Pump a first electrolyte through the electrochemical cell — 104

Pump a second charge electrolyte through the electrochemical cell — 106

Pump a first discharge electrolyte through the electrochemical cell — 108

Pump a second discharge electrolyte through the electrochemical cell — 110

(56)  References Cited

U.S. PATENT DOCUMENTS

| | | | | |
|---|---|---|---|---|
| 10,615,441 | B2 | 4/2020 | Kaku et al. | |
| 2004/0151977 | A1* | 8/2004 | Morrisey | H01M 8/188 |
| | | | | 429/105 |
| 2006/0063065 | A1 | 3/2006 | Clarke et al. | |
| 2007/0111043 | A1* | 5/2007 | Stocchiero | H01M 50/77 |
| | | | | 429/6 |
| 2010/0003545 | A1* | 1/2010 | Horne | H01M 8/20 |
| | | | | 429/105 |
| 2010/0036450 | A1 | 2/2010 | Axelrod et al. | |
| 2012/0135282 | A1 | 5/2012 | La Mantia et al. | |
| 2013/0011702 | A1* | 1/2013 | Horne | B60L 53/52 |
| | | | | 429/105 |
| 2013/0084506 | A1* | 4/2013 | Chang | H02J 7/0042 |
| | | | | 324/432 |
| 2014/0060666 | A1 | 3/2014 | Evans et al. | |
| 2014/0220463 | A1 | 8/2014 | Daniel | |
| 2014/0266058 | A1* | 9/2014 | Sathrum | H01M 10/46 |
| | | | | 429/61 |
| 2015/0086896 | A1* | 3/2015 | Chang | H01M 8/0482 |
| | | | | 324/432 |
| 2015/0099206 | A1* | 4/2015 | Horne | B60L 53/302 |
| | | | | 429/456 |
| 2015/0318580 | A1 | 11/2015 | Fukunaga et al. | |
| 2016/0020477 | A1* | 1/2016 | Smeltz | H01M 8/04992 |
| | | | | 429/418 |
| 2016/0293992 | A1* | 10/2016 | Song | H01M 8/0693 |
| 2017/0271705 | A1 | 9/2017 | Kim et al. | |
| 2018/0198148 | A1 | 7/2018 | Pozvonkov et al. | |
| 2019/0237792 | A1* | 8/2019 | Ikeuchi | H01M 8/0273 |
| 2019/0280316 | A1 | 9/2019 | Min et al. | |
| 2020/0076017 | A1 | 3/2020 | Shen et al. | |
| 2020/0106118 | A1 | 4/2020 | Wang et al. | |
| 2021/0143463 | A1* | 5/2021 | Song | H01M 8/188 |
| 2021/0143488 | A1 | 5/2021 | Kong et al. | |
| 2023/0144710 | A1* | 5/2023 | Saraidaridis | H01M 8/188 |
| | | | | 429/111 |

OTHER PUBLICATIONS

International Search Report & Written Opinion on PCT/US2022/053880 dated Apr. 12, 2023, 7 pages.

Collins, et al., "A novel flow battery: A lead acid battery based on an electrolyte with soluble lead(II) Part VIII. The cycling of a 10 cm×10 cm flow cell," Journal of Power Sources 195(6), pp. 1731-1738 (2010).

Consortium for Battery Innovation, "An innovation roadmap for advanced lead batteries: Technical specifications and performance improvements," retrieved from https://batteryinnovation.org/wp-content/uploads/2019/09/CBIRoadmap_FINAL.pdf, 32 pages (2019).

Hazza, et al., "A novel flow battery—A lead acid battery based on an electrolyte with soluble lead(II): IV. The influence of additives," Journal of Power Sources 149, pp. 103-111 (2005).

Pletcher & Wills, "A novel flow battery—A lead acid battery based on an electrolyte with soluble lead(II): III. The influence of conditions on battery performance," Journal of Power Sources 149, pp. 96-102 (2005).

* cited by examiner

100

1

LEAD ACID ELECTROCHEMICAL CELLS WITH PUMPED ELECTROLYTES AND METHODS OF MAKING AND USING THE SAME

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to electrochemical energy storage cells and methods of using the same.

BACKGROUND

Lead acid batteries are one of the oldest types of electrochemical energy storage devices and have been incrementally improved for more than one hundred years in many ways. Lead is an economically attractive and abundant raw material with a well-established supply chain, and lead acid batteries are non-flammable. Lead acid cells can be used in stationary storage systems but have a short calendar and cycle life, especially with deep charge/discharge cycling as well as at higher temperatures (>25° C.). Existing lead acid cells are generally not ideally suited for large scale stationary storage, including grid storage. For example, a typical grid storage system for solar/storage or wind/storage hybrid systems needs a 20-year calendar life, which is 7,300 cycles at 1 cycle/day. Additionally, economics dictate that these cycles should be high depth-of-discharge (DOD) in order to fully utilize the capital investments and impart cost-effectiveness. Several important lifecycle lead acid issues are related to acid stratification during charge and discharge which causes local variation in material utilizations and electrolytic efficiencies, these issues include positive grid corrosion and active material softening and negative electrode sulfation, which lead to compromised electrode morphologies, loss of active material utilization, and non-uniform current distribution related to active material nonuniformities.

SUMMARY

Embodiments described herein relate generally to electrochemical energy storage cells for use in situations which require high cycle life and which do not require especially high gravimetric energy density, such as stationary storage systems, and in particular, to electrochemical energy storage cells and methods of using the same.

At least one embodiment relates to an electrochemical cell assembly. The electrochemical cell assembly includes an electrochemical cell having a housing and a negative active material disposed within a first electrode chamber of the housing. The negative active material includes lead and/or lead sulfate. The electrochemical cell further includes a positive active material disposed within a second electrode chamber of the housing The positive active material may include lead, lead sulfate, lead oxide, and/or lead dioxide. The electrochemical cell assembly further includes a pumping assembly in fluid communication with a plurality of electrolyte reservoirs and configured to pump a plurality of electrolytes from the plurality of electrolyte reservoirs through either the first electrode chamber or the second electrode chamber during operation of the electrochemical cell based on a process of a cell cycle of the electrochemical cell.

Another embodiment relates to a method. The method includes providing an electrochemical cell. The electrochemical cell includes a housing and a negative active material disposed within a first electrode chamber of the housing. The negative active material includes lead and/or lead sulfate. The electrochemical cell further includes a positive active material disposed within a second electrode chamber of the housing. The positive active material may include lead, lead sulfate, lead oxide, and/or lead dioxide. The electrochemical cell further includes a separator disposed between the first electrode chamber and the second electrode chamber. The method further includes pumping a first charge electrolyte having a first charge acid concentration at a first charge flow rate during a charge process of a cell cycle of the electrochemical cell through the first electrode chamber. The method further includes pumping a first discharge electrolyte having a first discharge acid concentration at a first discharge flow rate during a discharge process of the cell cycle of the electrochemical cell through the first electrode chamber. The first acid discharge concentration may be different from the first acid charge concentration.

Another embodiment relates to a method of operating an electrochemical cell that includes a positive active material including lead, lead sulfate, lead oxide, and/or lead dioxide, and a negative active material including lead and/or lead sulfate. The method includes pumping a first charge electrolyte having a first charge concentration around and/or through the negative charge active material, and pumping a second charge electrolyte having a second charge concentration around and/or through the positive active material. The first charge concentration is different from the second charge concentration. The method further includes pumping a first discharge electrolyte having a first discharge concentration around and/or through the negative active material, and pumping a second discharge electrolyte having a second discharge concentration around and/or through the positive active material. The first discharge concentration may be different from the second discharge concentration.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
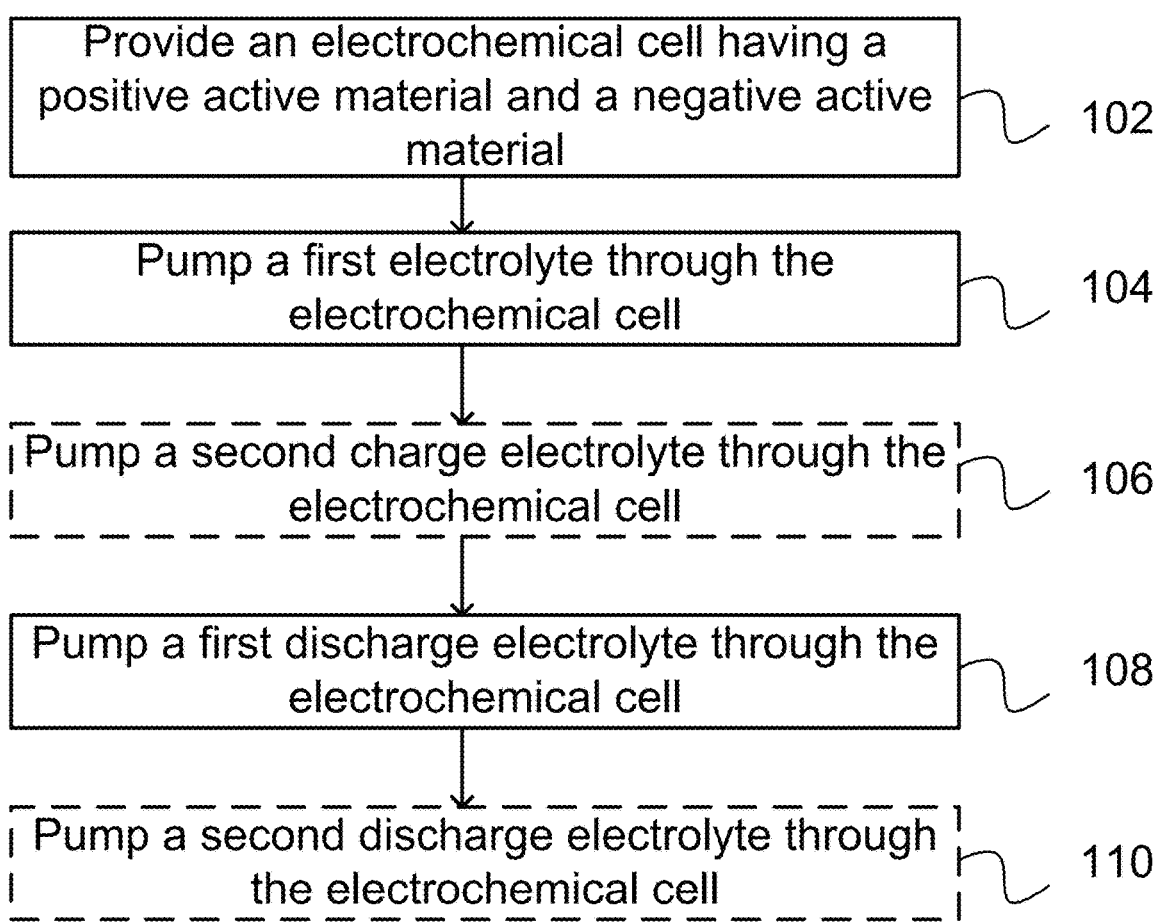
FIG. 1 is a schematic flow diagram of a method for extending a life of an electrochemical cell, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to electrochemical energy storage cells for use in stationary storage systems and methods of using the same.

Traditionally, lead acid cells have been improved with electrolyte modifications, cell modifications, electrode modifications, and cell designs. However, the chemistry and electrochemistry in lead acid batteries are difficult to co-optimize due to complex and often competing demands on electronic, mass transport and chemical reversibility and speciation of active materials. A chemical state of charge is defined by the molar fraction of lead sulfate within the electrode with respect to lead and/or lead dioxide phases. The chemical state of charge of the electrodes may be often not balanced. For example, after formation, the positive electrode is often not fully charged; similarly, sulfation on the negative electrode can drive the negative to lower relative chemical SOC. Furthermore, the optimal acid concentration for each electrode's chemical state of charge is often different for charge versus discharge and—for positive versus negative, and it may vary for various depths of discharge and targeted coulombic efficiency. A singular (i.e., shared) electrolyte cannot balance that trade-off sufficiently.

Embodiments of the present disclosure are discussed in the context of making an electrochemical cell, in particular making an electrochemical cell that optimizes pumped electrolytes for reduction or elimination of local concentration gradients and the use of different electrolytes during different operation of the electrochemical cell may by, for example, a charge process, a discharge process, or at open circuit. Further, different electrolytes may be utilized for each of the respective electrodes during the same process. In some embodiments, at least one sulfuric acid electrolyte is pumped into the electrochemical cell. In some embodiments, sulfuric acid electrolytes with different concentrations may be utilized during different processes of the electrochemical cell, such as by pumping a first electrolyte into a lead acid cell during a charging process and pumping a second electrolyte into the cell during a discharge process, each electrolyte's properties selected in order to stabilize and render the concentration of that electrolyte in the cell homogeneous for optimal power density and electrochemical reversibility during the respective charge or discharge process. In some embodiments, sulfuric acid electrolytes with different concentrations may be used in the cell during different processes of the operation such as a charge process, a discharge process, and an open circuit process. The cell includes multiple electrolytes tailored for different segments of the cycle. Sulfuric acid electrolytes with different concentrations may also be used for the positive active material and the negative active material Various embodiments of the electrochemical cell described herein may provide one or more benefits including, for example: (1) reducing or eliminating local concentration gradients; (2) optimizing the electrolyte used for different parts of the cycle; (3) preventing compromised electrode morphologies; (4) extending the lifetime of the electrochemical cell; (5) improving lead acid cell utilization in stationary storage systems; and (6) stabilizing the electrodes.

Some embodiments relate to a method 100, such as illustrated in FIG. 1, of operating an electrochemical cell. The operation by one of these processes may utilize a different electrolyte pumped by a pumping system through the electrochemical cell as further described below. Any suitable pumping system may be used for the pumping systems described herein, such as rotary lobe pumps, progressive cavity pumps, rotary gear pumps, piston pumps, diaphragm pumps, screw pumps, gear pumps, hydraulic pumps, gravity feed pumps, or any other suitable pump. The electrochemical cell may comprise a first electrode that includes a negative active material and a second electrode that includes a positive active material. In some embodiments, the positive active material may include lead dioxide, lead sulfate, lead monoxide, lead hydroxide, combinations thereof, or any other suitable material. In some embodiments, the negative active material may include metallic lead, lead sulfate, lead oxide, lead carbonate, combinations thereof, or any other suitable material.

In some embodiments, the negative active material and/or the positive active material are porous. In other embodiments, the negative active material and/or the positive active material are non-porous, such as being impermeable to an associated electrolyte.

The positive active material and the negative active material may be disposed within a housing, such as a battery casing. The battery casing may house a plurality of cells each having a positive active material, negative active material, and electrolyte(s).

In some embodiments, a volume of the housing is continuous between the first electrode chamber and the second electrode chamber, allowing circulating of an electrolyte that is functional for reactions at both the first electrode and the second electrode. In some embodiments, the electrochemical cell further includes a separator disposed between the negative active material and the positive active material, defining a first electrode chamber and a second electrode chamber, respectively. In some embodiments, each of the first electrode chamber and the second electrode chamber is in ionic communication through the separator, providing physical separation of the electrodes and electrolytes associated with the first electrode chamber and the second electrode chamber. The separator may include cellulose, polyvinyl chloride, organic rubber, polyolefin, polyethylene, polypropylene, any other suitable material, or combinations thereof. In further embodiments, no separator may be utilized.

In some embodiments, a first electrolyte may be pumped into the electrochemical cell, such as from a first electrolyte reservoir. In some embodiments, the first electrolyte may in contact with the negative active material. The first electrolyte may comprise sulfuric acid. In other embodiments, the first electrolyte may comprise any other suitable electrolyte having an acidic pH (e.g., a pH of <3). In some embodiments, the first electrolyte may include a plurality of first additives (e.g., sodium sulfate, organic materials, etc.) and/or dopants (e.g., metals, other insoluble sulfate crystals, etc.). In some embodiments, the overall reaction at the negative active material may be depicted by Equation 1.

$$PbSO_{4(s)} + 2e^- \leftrightarrow Pb_{(s)} + SO_4^{2-}{}_{(aq)} \qquad [1]$$

In some embodiments, the first electrolyte is flowed around and/or through the negative active material (optionally, and the positive active). In some embodiments, the negative active material is porous and the first electrolyte is flowed, at least partially, through pores of the negative active material. In such embodiments, the first electrolyte may be flowed up through, down through, or across through the negative active material and/or the positive active material. In some embodiments, the negative active is impermeable to the first electrolyte, and the first electrolyte may be flowed around the negative active or around a face of the negative active material. The first electrolyte may have a first concentration in a range of about 0.05 to 10 M (e.g., 0.05 M, 0.1 M, 0.5 M, 1 M, 2 M, 4 M, 6 M, 8 M, or 10 M, inclusive). The first concentration may be selected to optimize the first electrolyte for reaction with the negative active material. The first concentration may be selected for a non-equilibrium steady state that is maintained by the replenishment of the first electrolyte from the first electrolyte reservoir. In some embodiments, the first concentration may be maintained constantly and homogeneous at a pre-defined non-equilibrium steady state concentration within the electrodes.

In one embodiment, a second electrolyte may be pumped into the electrochemical cell from a second electrolyte reservoir. In some embodiments, the second electrolyte may be in contact with the positive electrode. The second electrolyte may comprise sulfuric acid. In other embodiments, the second electrolyte may comprise any other suitable electrolyte having an acidic pH (e.g., a pH of <3). In some embodiments, the second electrolyte may include a plurality of second additives (e.g., sodium sulfate, organic materials, etc.) and/or dopants (e.g., metals, other insoluble sulfate crystals, etc.). In such embodiments, the overall reaction at the positive active material may be depicted by Equation 2.

$$PbSO_{4(s)}+2H_2O_{(l)} \leftrightarrow PbO_{2(s)}+4H^+_{(aq)}+2e^-+SO_4^{2-}_{(aq)} \qquad [2]$$

The second electrolyte may be flowed around and/or through the positive active material within the second electrode chamber. In some embodiments, the positive active material is porous and the second electrolyte is flowed through pores of the positive active material and may also be flowed around the positive active material. In such embodiments, the second electrolyte may be flowed up through, down through, or across through the positive active material. In some embodiments, the positive active material is impermeable, and the second electrolyte may be flowed around the positive active material or a face of the positive active material.

The second electrolyte may have a second concentration in a range of about 0.05 to 10 M (e.g., 0.05 M, 0.1 M, 0.5 M, 1 M, 2 M, 4 M, 6 M, 8 M, or 10 M, inclusive). The second electrolyte may be pumped into the electrochemical cell from a second electrolyte reservoir and flowed around and/or through the positive active material. The second concentration may be different than the first concentration in order to optimize the second electrolyte for reaction with the positive active material. The second concentration may be selected for a non-equilibrium steady state that is maintained by the replenishment of the second electrolyte from the second electrolyte reservoir. In some embodiments, the second concentration may be maintained constantly at a steady state concentration while the second electrolyte is pumped. In such embodiments, the steady state concentration is driven by changing parameters of the second electrolyte such as stoichiometry.

In some embodiments, the electrochemical cell includes a monitoring electrode or sensor configured to monitor the steady state concentration of the first electrolyte and/or the second electrolyte. The monitoring electrode or sensor may be an acoustic sensor, a sensor to detect chemical drift, a sensor to detect electrical drift, or any other suitable sensor. In some embodiments, the first electrolyte and/or second electrolyte are removed from the electrochemical cell prior to the flow of a third and fourth electrolyte that are similarly pumped as described with regard to the respective first electrolyte and the second electrolyte. The first electrolyte and the second electrolyte may be associated with a first of a charge process, a discharge process, or an open circuit process, and a third and fourth electrolyte are associated with another of the charge process, discharge process, or open circuit.

Figure 2:
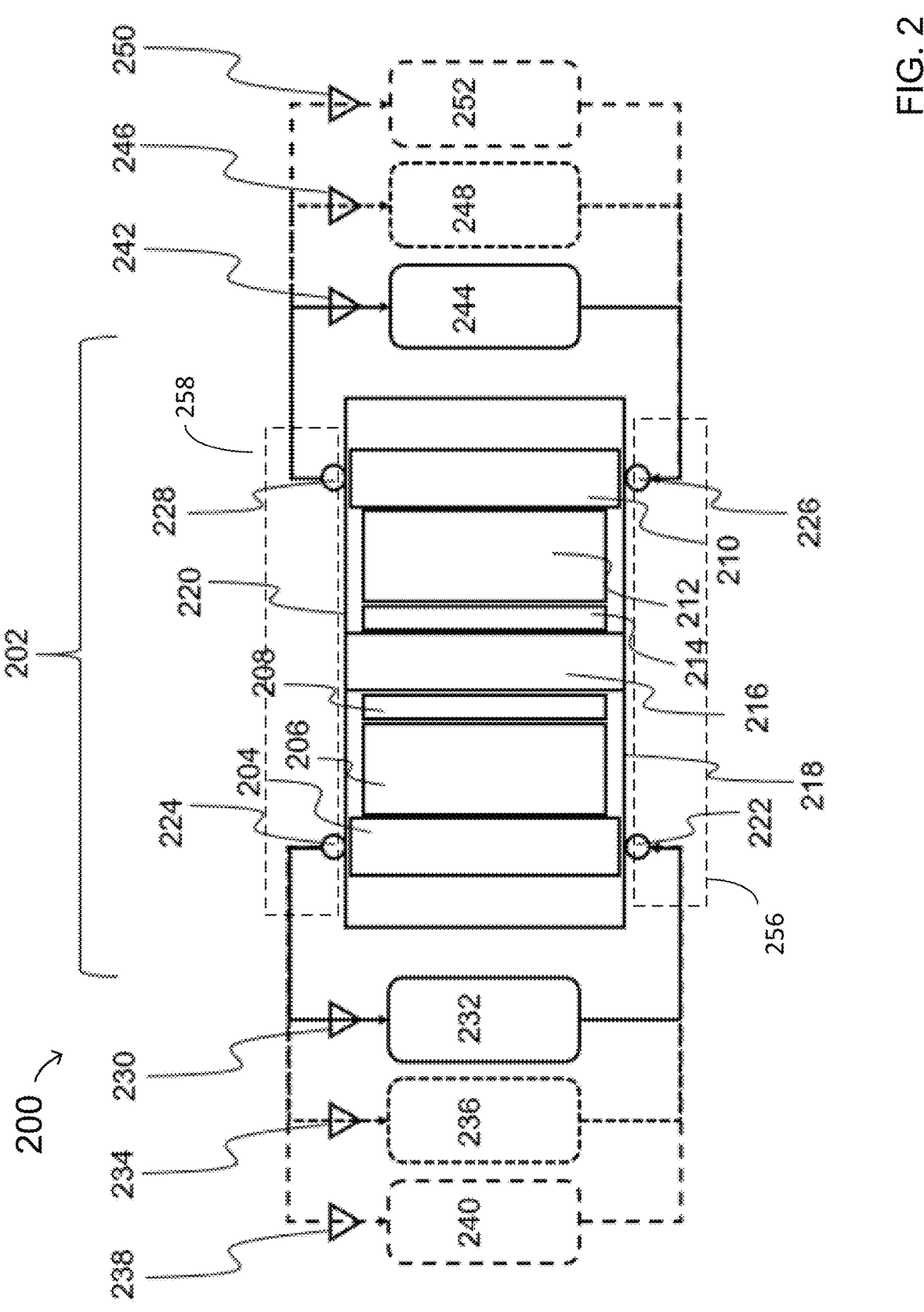
FIG. 2 is a schematic block diagram of an electrochemical cell assembly, according to an embodiment.

FIG. 2 is a schematic block diagram of an electrochemical cell assembly 200, in accordance with some embodiments. The electrochemical cell assembly 200 includes an electrochemical cell with a housing 202 and a first electrode including negative active material 206, as the cathode during charge/recharge, and a second electrode including a positive active material 212, as the anode during charge/recharge, disposed within the housing 202. In some embodiments, the housing 202 may be a battery casing. The electrochemical cell assembly 200 may be operated using operations described with respect to the method 100. In some embodiments, the negative active material 204 may include metallic lead, lead sulfate, lead oxide, lead carbonate, combinations thereof, or any other suitable material. In some embodiments, positive active material 212 may include lead dioxide, lead sulfate, lead monoxide, lead hydroxide, combinations thereof, or any other suitable material. In some embodiments, the negative active material 206 and/or the positive active material 212 are porous. In some embodiments, the negative active material 206 and/or the positive active material 212 are impermeable.

The electrochemical cell assembly 200 may also include a separator 216 disposed between the negative active material 206 and the positive active material 212 in the housing 202, in some embodiments. In other embodiments, the electrochemical assembly 200 may not include the separator 216. The separator 216 may include cellulose, polyvinyl chloride, organic rubber, polyolefin, polyethylene, polypropylene, any other suitable material, or combinations thereof. The separator 216 forms two chambers of the housing 202: a first electrode chamber 218 and a second electrode chamber 220. The first electrode chamber 218 and the second electrode chamber 220 may be a cavity or a void space. The first electrode chamber 218 includes a first flow inlet 222 and a first flow outlet 224 configured to also allow the flow of an electrolyte. The first electrode chamber 218 may further include a first flow field 204 for electrolytes to flow through and a first gap spacer 208 configured to control the electrode gap and/or allow for flow over active material that is impermeable. A fluid may be pumped through the first flow field 204 and/or the first gap spacer 208. The first flow field 204 and the first gap spacer 208 may be any suitable shape such as, but not limited to, rectangular, circular, triangular, trapezoidal, or any combination thereof, and may be made from any suitable material such as, but not limited to, plastic, metal, ceramic, or combinations thereof.

The second electrode chamber 220 includes a second flow inlet 226 and a second flow outlet 228 configured to allow the flow of an electrolyte. The second electrode chamber 220 may further include a second flow field 210 for electrolytes to flow through and a second gap spacer 214 configured to control an electrode gap and/or allow for flow over active material that is impermeable. A fluid may be pumped in the second flow field 210 and/or the second gap spacer 214. The electrode gap may be a space in between the negative active material 206 and the positive active material 212. The second flow field 210 and the second gap spacer 214 may be any suitable shape such as, but not limited to, rectangular, circular, triangular, trapezoidal, or any combination thereof, and may be made from any suitable material such as, but not limited to, plastic, metal, ceramic, or combinations thereof. The electrochemical cell assembly 200 may further include an inlet manifold 256 associated with each of first flow inlet 222 and the second flow inlet 226. The electrochemical cell assembly 200 may further include an outlet manifold 258 associated with each of first flow outlet 224 and the second flow outlet 228.

The electrochemical cell assembly 200 may also contain at least two electrolytes, each stored in their own electrolyte reservoir. The electrochemical cell assembly 200 may also contain at least four electrolytes, each stored in their own electrolyte reservoir. In some embodiments, the electrochemical cell assembly 200 may include six electrolytes, each stored in their own electrolyte reservoir. It is understood that the number of electrolytes is not limited to six electrolytes and can include any number of electrolytes in order to optimize the lifetime of the electrochemical cell. Each electrolyte reservoir may be associated in fluid communication with the inlet manifold.

With reference to FIG. 2, the electrochemical cell assembly 200 may include a first charge electrolyte stored in a first charge electrolyte reservoir 232. The first charge electrolyte is may be as described with respect to method 100 and the first electrolyte. The first charge electrolyte may be pumped through the first electrode chamber 218 such that the first charge electrolyte flows around and/or through the negative active material 206. In some embodiments, the negative active material 206 is porous and the first charge electrolyte is flowed through pores of the negative active material 206 and may also be flowed around the negative active material 206. In such embodiments, the first charge electrolyte may be flowed up through, down through, or across through the negative active material 206. In some embodiments, the negative active material 206 is impermeable, and the first charge electrolyte may be flowed around the negative active material 206 or around a face of the negative active material 206 through the second gap spacer 208.

A first charge electrolyte pumping assembly 230 may be used to pump the first charge electrolyte through the first electrode chamber 218 of the electrochemical cell assembly 200. The first charge electrolyte may enter the first electrode chamber 218 through the first flow inlet 222 and exit the first electrode chamber 218 through the first flow outlet 224. The first charge electrolyte may comprise sulfuric acid having a first charge concentration, and is pumped at a first charge flow rate. The first charge electrolyte may be flowed during a charge process of a cell cycle of the electrochemical cell.

In some embodiments, the first charge electrolyte may flow through the first electrode chamber 218 and the second electrode chamber 220 such that the first charge electrolyte flows around and/or through both the negative active material 206 and the positive active material 212. In some embodiments, the first charge electrolyte may enter the housing 202 through the first flow inlet 222 and exit the housing through the second flow outlet 228. In other embodiments, the first charge electrolyte may enter the housing 202 through the second flow inlet 226 and exit the housing 202 through the first flow outlet 224.

In some embodiments, the first charge electrolyte may flow through the second electrode chamber 220 such that the first charge electrolyte flows around and/or through the positive active material 212. In such embodiments, the first charge electrolyte may enter the second electrode chamber 220 through the second flow inlet 226 and exit the second electrode chamber 220 through the second flow outlet 228.

The first charge electrolyte may comprise sulfuric acid, or any other suitable electrolyte having an acidic pH (e.g., a pH of <3). In some embodiments, the first charge electrolyte may include a plurality of first charge additives (e.g., sodium sulfate, organic materials, etc.) and/or dopants (e.g., metals, other insoluble sulfate crystals, etc.). The first charge electrolyte may have a first charge concentration in a range between about 0.05 to about 10 M (e.g., 0.05 M, 0.1 M, 0.5 M, 1 M, 2 M, 4 M, 6 M, 8 M, or 10 M, inclusive). The first charge electrolyte may be pumped into the electrochemical cell from a first charge electrolyte reservoir and flowed around and/or through the negative active material. The first charge concentration may be selected for a non-equilibrium steady state that is maintained by the replenishment of the first charge electrolyte from a first charge electrolyte reservoir 332. In some embodiments, the first charge concentration may be maintained constantly and homogeneous at a pre-defined concentration while the first charge electrolyte is pumped. In such embodiments, the steady state concentration is driven by changing parameters of the first charge electrolyte such as stoichiometry. In some embodiments, the electrochemical cell includes a first electrode or sensor configured to monitor the electrolyte concentration of the first charge electrolyte. The monitoring electrode or sensor may be an acoustic sensor, a sensor to detect chemical drift, a sensor to detect electrical drift, or any other suitable sensor.

In some embodiments, the first charge electrolyte is optimized for the charge process and designed to improve reduction at the negative active material, by for example, increasing the availability of electrons to react with the lead ions in solution and solubility of lead ions in solution to increase the kinetics of the lead sulfate dissolution. The first charge electrolyte may be continuously pumped into the cell at a first charge flow rate so as to help purge trapped gas bubbles in the active material or separator and reduce or eliminate local concentration gradients driven by mass transport issues during the electrochemical reaction, gravity or slow diffusion through pores that generally occurs with a stationary non-flowing electrolyte. The first charge flow rate may be in a range between about 0.001 to 100 liters/minute/ $cm^2$ (e.g., 0.001 liters/minute/$cm^2$, 0.01 liters/minute/$cm^2$, 0.1 liters/minute/$cm^2$, 1 liters/minute/$cm^2$, 10 liters/minute/ $cm^2$, 50 liters/minute/$cm^2$, or 100 liters/minute/$cm^2$, inclusive).

The electrochemical cell assembly 200 may further include a second charge electrolyte stored in a second charge electrolyte reservoir 244. In some embodiments, the second electrolyte is the same as the second charge electrolyte described with respect to method 100. The second charge electrolyte may be pumped through the second electrode chamber 220 such that the second charge electrolyte flows around and/or through the positive active material 212. In some embodiments, the positive active material 212 is porous and the second charge electrolyte is flowed through pores of the positive active material 212 and may also be flowed around the positive active material 212. In such embodiments, the second charge electrolyte may be flowed up through, down through, or across through the positive active material 212. In some embodiments, the positive active material 212 is impermeable, and the second charge electrolyte may be flowed around the positive active material 212 or a face of the positive active material 212 through the first gap spacer 214.

A second charge electrolyte pumping assembly 242 may be used to pump the second charge electrolyte through the second electrode chamber 220 of the electrochemical cell assembly 200. The second charge electrolyte may enter the second electrode chamber 220 through the second flow inlet 226 and exit the second electrode chamber 220 through the second flow outlet 228.

The second charge electrolyte may comprise sulfuric acid, or any other suitable electrolyte having an acidic pH (e.g., a pH of <3). In some embodiments, the second charge electrolyte may include a plurality of second charge additives (e.g., sodium sulfate, organic materials, etc.) and/or dopants (e.g., metals, other insoluble sulfate crystals, etc.). The plurality of second additives may be different than or the same as the first charge additives. The second charge electrolyte may have a second charge concentration in a range between about 0.05 to about 10 M (e.g., 0.05 M, 0.1 M, 0.5 M, 1 M, 2 M, 4 M, 6 M, 8 M, or 10 M, inclusive) and may be flowed through the second electrode chamber 220 at a second charge flow rate. The second charge concentration of the second charge electrolyte is different from the first charge concentration of the first charge electrolyte. The second charge flow rate of the second charge electrolyte may be different or equal to the first charge flow rate of the first charge electrolyte. The second charge flow rate of the second charge electrolyte may be slower than the first charge flow rate in some embodiments where the positive active material 212 lacks sufficient adhesion to the second flow field 210 in comparison to the negative active material 206 or due to a larger surface area of the positive active material 212 in comparison to a surface area of the negative active material 206. The second charge electrolyte may be pumped during the charge process of the electrochemical cell. The first charge electrolyte and the second charge electrolyte may be resident in the cell simultaneously, with the first charge electrolyte pumped into the first electrode chamber 218 and the second charge electrolyte pumped into the second electrode chamber 220.

Alternatively, the first charge electrolyte may be in fluid communication with both the first electrode chamber 218 and the second electrode chamber 220 and then evacuated as the second charge electrolyte is pumped. In such embodiments, the first charge electrolyte may be removed from the electrochemical cell and the second charge electrolyte pumped into the electrochemical cell. The second charge electrolyte may be in fluid communication with both active materials, providing a sequential series of electrolytes. It is understood that the number of electrolytes pumped through the electrochemical cell assembly 200 is not limited to two during any stage of the cell cycle.

In such embodiments, the second charge electrolyte is optimized for the charge process and designed to improve oxidation at the positive active material by, for example, increasing the rates of electron transfer to the positive active material or improving the overall kinetics of the reaction of the protons produced from a reaction with the lead sulfate and water by improving mass transport. In some embodiments, the second charge electrolyte is flowed concurrently with the first charge electrolyte during the charge process. The second charge electrolyte may be continuously pumped into the cell at a second charge flow rate and can reduce or eliminate local concentration gradients. The second charge flow rate may be in a range between about 0.001 to 100 liters/minute/cm² (e.g., 0.001 liters/minute/cm², 0.01 liters/ minute/cm², 0.1 liters/minute/cm², 1 liters/minute/cm², 10 liters/minute/cm², 50 liters/minute/cm², or 100 liters/minute/cm², inclusive). In some embodiments, the second charge flow rate may be less than the first charge flow rate. In such embodiments, the second charge flow rate may be slower due to poorer adhesion of the positive active material in comparison to the negative active material. The second charge flow rate may also be slower due to a higher surface area of the positive active material in comparison to the negative active material which may make the positive active material more susceptible to self-discharge.

With continued reference to FIG. 2, the electrochemical cell assembly 200 may further include a first discharge electrolyte stored in a first discharge electrolyte reservoir 236. The first discharge electrolyte may be as described with regard to the second electrolyte in method 100. The first discharge electrolyte may be pumped during a discharge process of the cell cycle of the electrochemical cell. The first discharge electrolyte may be pumped through the first electrode chamber 218 such that the third electrolyte flows around and/or through the negative active material 206. In some embodiments, the negative active material 206 is porous and the first discharge electrolyte is flowed through pores of the negative active material 206 and may also be flowed around the negative active material 206. In such embodiments, the first discharge electrolyte may be flowed up through, down through, or across through the negative active material 206. In some embodiments, the negative active material 206 is impermeable, and the first discharge electrolyte may be flowed around the negative active material 206 or a face of the negative active material 206 through the second gap spacer 208.

A first discharge electrolyte pumping assembly 234 may be used to pump the first discharge electrolyte through the first electrode chamber 218 of the electrochemical cell assembly 200. The first discharge electrolyte may enter the first electrode chamber 218 through the first flow inlet 222 and exit the first electrode chamber 218 through the first flow outlet 224. The first discharge electrolyte may comprise sulfuric acid having a first discharge concentration and may be pumped through the first electrode chamber 218 at a first discharge flow rate. In some embodiments, the first discharge concentration may be different from the first charge concentration and the second charge concentration. The first discharge flow rate may be different or equal to the first charge flow rate or the second charge flow rate.

In some embodiments, the first discharge electrolyte may flow through the first electrode chamber 218 and the second electrode chamber 220 such that the first charge electrolyte flows around and/or through both the negative active material 206 and the positive active material 212. In some embodiments, the first discharge electrolyte may enter the housing 202 through the first flow inlet 222 and exit the housing through the second flow outlet 228. In other embodiments, the first discharge electrolyte may enter the housing 202 through the second flow inlet 226 and exit the housing 202 through the first flow outlet 224.

In some embodiments, the first discharge electrolyte may flow through the second electrode chamber 220 such that the first discharge electrolyte flows around and/or through the positive active material 212. In such embodiments, the first discharge electrolyte may enter the second electrode chamber 220 through the second flow inlet 226 and exit the second electrode chamber 220 through the second flow outlet 228.

In some embodiments, the first discharge electrolyte may be flowed through the cell as the first charge electrolyte is sequentially flowed out of the cell. The first discharge electrolyte may have a first discharge concentration in a range between about 0.05 to 10 M (e.g., 0.05 M, 0.1 M, 0.5 M, 1 M, 2 M, 4 M, 6 M, 8 M, or 10 M, inclusive). The first discharge concentration may be different than the first charge concentration and/or second charge concentration, in order to optimize the first discharge electrolyte for the discharge process of the cycle. The first discharge electrolyte may be pumped into the electrochemical cell from the first discharge electrolyte reservoir 246 and flowed over or through the negative active material 206. The first discharge concentration may be selected for a non-equilibrium steady state that is maintained by the replenishment of the first discharge electrolyte from the first discharge electrolyte reservoir. In some embodiments, the first discharge concentration may be maintained constantly homogeneous at a pre-defined concentration while the first discharge electrolyte is pumped. In such embodiments, the steady state concentration is driven by changing parameters of the first discharge electrolyte such as stoichiometry. In some embodiments, the electrochemical cell includes a monitoring electrode configured to monitor the steady state concentration of the second discharge electrolyte. The monitoring electrode or sensor may be an acoustic sensor, a sensor to detect chemical drift, a sensor to detect electrical drift, or any other suitable sensor.

In such embodiments, the first discharge electrolyte is optimized for the discharge process and configured to improve reduction at the negative active material, by for example, improving the kinetics of the reaction of the lead ions produced from a reaction with lead ions and sulfate. The first discharge electrolyte is flowed during a different process of the cell cycle than the first charge electrolyte and/or second charge electrolyte. The first discharge electrolyte may be continuously pumped into the cell at a first discharge flow rate and can reduce or eliminate local concentration gradients. The first discharge flow rate may be in a range between about 0.001 to 100 liters/minute/cm$^2$ (e.g., 0.001 liters/minute/cm$^2$, 0.01 liters/minute/cm$^2$, 0.1 liters/minute/cm$^2$, 1 liters/minute/cm$^2$, 10 liters/minute/cm$^2$, 50 liters/minute/cm$^2$, or 100 liters/minute/cm$^2$, inclusive).

In some embodiments, the first discharge electrolyte is pumped into the cell as the first charge electrolyte or second charge electrolyte is sequentially pumped out of the cell. The first discharge electrolyte may comprise sulfuric acid, or any other suitable electrolyte having an acidic pH (e.g., a pH of <3). In some embodiments, the first discharge electrolyte may include a plurality of first discharge additives (e.g., sodium sulfate, organic materials, etc.) and/or dopants (e.g., metals, other insoluble sulfate crystals, etc.). The first discharge additives may be the same as or different from the first charge additives and/or the second charge additives. In some embodiments, the first discharge electrolyte may be flowed during a discharge process of the cell cycle. The first discharge electrolyte may be flowed around and/or through the negative active material 206 within the first electrode chamber 218.

In some embodiments, the positive active material is porous and the first discharge electrolyte is flowed through pores of the positive active material and may also be flowed around the positive active material. In such embodiments, the first discharge electrolyte may be flowed up through, down through, or across through the positive active material. In some embodiments, the positive active material is impermeable, and the first discharge electrolyte may be flowed around the positive active material or a face of the positive active material. The sulfuric acid may react with the positive active material to produce lead sulfate.

The electrochemical cell assembly 200 may further include a second discharge electrolyte stored in a second discharge electrolyte reservoir 248. The second discharge electrolyte may be pumped during the discharge process of the cell cycle of the electrochemical cell. The second discharge electrolyte may be pumped through the second electrode chamber 220 such that the second discharge electrolyte flows around and/or through the positive active material 212. In some embodiments, the positive active material 212 is porous and the second discharge electrolyte is flowed through pores of the positive active material 212 and may also be flowed around the positive active material 212. In such embodiments, the second discharge electrolyte may be flowed up through, down through, or across through the positive active material 212. In some embodiments, the positive active material 212 is impermeable, and the second discharge electrolyte may be flowed around the positive active material 212 or a face of the positive active material 212 through the first gap spacer 214.

A second discharge electrolyte pumping assembly 246 may be used to pump the second discharge electrolyte through the second electrode chamber 220 of the electrochemical cell assembly 200. In some embodiments, the first charge electrolyte pumping assembly 230, the second charge electrolyte pumping assembly 242, the first discharge electrolyte pumping assembly 234, and the second discharge electrolyte pumping assembly 246 are part of a larger pumping assembly configured to pump a plurality of electrolytes. The plurality of electrolytes may include the first charge electrolyte, the second charge electrolyte, the first discharge electrolyte, and the second discharge electrolyte.

The second discharge electrolyte may enter the second electrode chamber 220 through the second flow inlet 226 and exit the second electrode chamber 220 through the second flow outlet 228. The first discharge electrolyte and the second discharge electrolyte may be resident in the cell simultaneously, with the second discharge electrolyte pumped into the second electrode chamber 220 and the first discharge electrolyte pumped into the first electrode chamber 218. Alternatively, the first discharge electrolyte may be in fluid communication with both the first electrode chamber 218 and the second electrode chamber 220 and then evacuated as the second discharge electrolyte is pumped, the second discharge electrolyte also being in fluid communication with both active materials, providing a sequential series of electrolytes.

The second discharge electrolyte may have a second discharge concentration in a range between about 0.05 to 10 M (e.g., 0.05 M, 0.1 M, 0.5 M, 1 M, 2 M, 4 M, 6 M, 8 M, or 10 M, inclusive). The second discharge concentration may be different than the first discharge concentration, the first charge concentration and/or second charge concentration in order to optimize the second discharge electrolyte for the discharge process of the cycle as compared to the charge process. The second discharge concentration may be selected for a non-equilibrium state that is maintained by the replenishment of the second discharge electrolyte from the second discharge electrolyte reservoir 248. In some embodiments, the second discharge concentration may be maintained constantly at a steady state concentration while the second discharge electrolyte is pumped. In such embodiments, the steady state concentration is driven by changing parameters of the second discharge electrolyte such as stoichiometry. In some embodiments, the electrochemical cell includes a monitoring electrode configured to monitor the steady state concentration of the second discharge electrolyte. The monitoring electrode or sensors may be an acoustic sensor, a sensor to detect chemical drift, a sensor to detect electrical drift, or any other suitable sensor.

The second discharge electrolyte may have a second discharge flow rate. The second discharge flow rate may be different or equal to the first discharge flow rate, second charge flow rate, or first charge flow rate. It is understood that the number of electrolytes pumped through the housing 202 around and/or through the positive active material 212 is not limited to two during the discharge stage of the cell cycle. It is understood that a plurality of electrolytes in the electrochemical cell assembly 200 may each comprise sulfuric acid having a different composition or concentration.

In such embodiments, the second discharge electrolyte is optimized for the discharge stage and configured to improve oxidation at the positive active material, by for example, increasing the electron transfer rates to the positive active material or improving the kinetics of the reaction of the electrons produced from a reaction with the lead and sulfate ions. The second discharge electrolyte may be continuously pumped into the cell at a second discharge flow rate and can reduce or eliminate local concentration gradients. The second discharge flow rate may be in a range between about 0.001 to 100 liters/minute/cm$^2$ (e.g., 0.001 liters/minute/cm$^2$, 0.01 liters/minute/cm$^2$, 0.1 liters/minute/cm$^2$, 1 liters/minute/cm$^2$, 10 liters/minute/cm$^2$, 50 liters/minute/cm$^2$, or 100 liters/minute/cm$^2$, inclusive). In some embodiments, the second discharge flow rate may be greater than the first discharge flow rate. In such embodiments, the second discharge flow rate may be greater due to poorer adhesion of the positive active material in comparison to the negative active material. The second discharge flow rate may also be greater due to a higher surface area of the positive active material in comparison to the negative active material which may make the positive active material more susceptible to self-discharge.

In some embodiments, the first charge electrolyte and/or second charge electrolyte is removed from the electrochemical cell prior to the flow of the second discharge electrolyte. In some embodiments, the second discharge electrolyte is pumped into the cell as the first charge electrolyte or second charge electrolyte is sequentially pumped out of the cell. In some embodiments, the second discharge electrolyte is pumped into the cell concurrently with the first discharge electrolyte. In other embodiments, the second discharge electrolyte is not pumped into the cell while the first discharge electrolyte is pumped into the cell.

The second discharge electrolyte may comprise sulfuric acid or any other suitable electrolyte having an acidic pH (e.g., a pH of <3). In some embodiments, the second discharge electrolyte may include a plurality of second discharge additives (e.g., sodium sulfate, organic materials, etc.) and/or dopants (e.g., metals, sodium crystals, etc.). The second discharge additives may be the same as or different from the first discharge additives and/or the first charge additives. In some embodiments, the second discharge electrolyte may be flowed during the discharge process of the cell cycle. The second discharge electrolyte may be flowed around and/or through the negative active material within the second electrode chamber 220.

With continued reference to FIG. 2, in some embodiments, the electrochemical cell assembly 200 is an open circuit process in which there is no active exchange of electrons. In such embodiments, the electrochemical cell assembly 200 includes a negative active material 206 and a positive active material 212, which will be referred to as such for description of these embodiments although it will be appreciated that the respective materials may not be participating in an electrochemical reaction as an active materials. The negative active material 206 is in the first electrode chamber 218, and the positive active material 212 is in the second electrode chamber 220. In some embodiments, the electrochemical cell assembly 200 may be configured such that one or more electrolytes that are optimized for conditioning the negative active material 206 and/or positive active material 212 to prevent degradation of the negative active material 206 and/or positive active material 212 are pumped through the electrochemical cell assembly 200 during a long term storage phase of the electrochemical cell assembly 200.

For example, in some embodiments, the electrochemical cell assembly 200 further includes a first open circuit electrolyte stored in a first open circuit electrolyte reservoir 240. The first open circuit electrolyte may be pumped during the open circuit process of the cell cycle of the electrochemical cell. The first open circuit electrolyte may be pumped through the first electrode chamber 218 and flowed around and/or through the negative active material 206 within the first electrode chamber 218. In some embodiments, the negative active material 206 is porous and the first open circuit electrolyte is flowed through pores of the negative active material 206 and may also be flowed around the negative active material 206. In such embodiments, the first open circuit electrolyte may be flowed up through, down through, or across through the negative active material 206. In some embodiments, the negative active material 206 is impermeable, and the first open circuit electrolyte may be flowed around the negative active material 206 or a face of the negative active material 206 through the second gap spacer 208.

A first open circuit electrolyte pumping assembly 238 may be used to pump the first open circuit electrolyte 240 through the first electrode chamber 218 of the electrochemical cell assembly 200. In some embodiments, the first open circuit electrolyte pumping assembly 238 may be part of the larger pumping assembly. The first open circuit electrolyte may enter the first electrode chamber 218 after a prior electrolyte has been completely drained from the second electrode chamber 218, or sequentially as prior electrolyte is being pumped out of the first electrode chamber 218. The first open circuit electrolyte may enter the first electrode chamber 218 through the first flow inlet 222 and exit the first electrode chamber 218 through the first flow outlet 224.

In some embodiments, the first open circuit electrolyte may flow through the first electrode chamber 218 and the second electrode chamber 220 such that the first open circuit electrolyte flows around and/or through both the negative active material 206 and the positive active material 212. In some embodiments, the first open circuit electrolyte may enter the housing 202 through the first flow inlet 222 and exit the housing through the second flow outlet 228. In other embodiments, the first open circuit electrolyte may enter the housing 202 through the second flow inlet 226 and exit the housing 202 through the first flow outlet 224.

In some embodiments, the first open circuit electrolyte may flow through the second electrode chamber 220 such that the first open circuit electrolyte flows around and/or through the positive active material 212. In such embodiments, the first open circuit electrolyte may enter the second electrode chamber 220 through the second flow inlet 226 and exit the second electrode chamber 220 through the second flow outlet 228.

The first open circuit electrolyte may comprise sulfuric acid or any other suitable electrolyte having an acidic pH (e.g., a pH of <3). In some embodiments, the first open circuit electrolyte may include a plurality of first open circuit additives (e.g., sodium sulfate, organic materials, etc.) and/ or dopants (e.g., metals, other insoluble sulfate crystals, etc.). The first open circuit additives may be the same as or different from the first discharge additives, the first charge additives, and/or the second discharge additives. The first open circuit electrolyte has a first open circuit concentration and may be flowed through the first electrode chamber 218 at a first open circuit flow rate. The first open circuit concentration may be in a range between about 0.05 to 10 M (e.g., 0.05 M, 0.1 M, 0.5 M, 1 M, 2 M, 4 M, 6 M, 8 M, or 10 M, inclusive) and different from the first charge concentration, the second charge concentration, the first discharge concentration, and the second discharge concentration. The first open circuit concentration may be selected for a non-equilibrium steady state that is maintained by the replenishment of the first open circuit electrolyte from the first open circuit electrolyte reservoir 240. In some embodiments, the first open circuit concentration may be maintained constantly at a steady state concentration while the first open circuit electrolyte is pumped. In such embodiments, the steady state concentration is driven by changing parameters of the first open circuit electrolyte such as stoichiometry.

The first open circuit flow rate may be in a range between about 0.001 to 100 liters/minute/cm$^2$ (e.g., 0.001 liters/minute/cm$^2$, 0.01 liters/minute/cm$^2$, 0.1 liters/minute/cm$^2$, 1 liters/minute/cm$^2$, 10 liters/minute/cm$^2$, 50 liters/minute/cm$^2$, or 100 liters/minute/cm$^2$, inclusive) and different from or equal to the first charge flow rate, the second charge flow rate, the first discharge flow rate, or the second discharge flow rate. In some embodiments, pumping the first open circuit electrolyte so that it flows around and/or through the negative active material 206 and/or the positive active material 212 during the open circuit process for long term storage may result in stripping off buildup on the negative active material 206, the negative active material 206 and the positive active material 212, or the positive active material 212 (e.g., lead oxide, lead sulfate). In some embodiments, the first open circuit electrolyte may be used to strip off buildup on the negative active material 206 and/or positive active material 212 (e.g., lead sulfate, lead oxide, etc.) and may flow during any process of the cell cycle. In some embodiments, the first open circuit electrolyte is optional.

In some embodiments, the electrochemical cell assembly 200 further includes a second open circuit electrolyte stored in a second open circuit electrolyte reservoir 252. The second open circuit electrolyte may be pumped during the open circuit process of the cell cycle of the electrochemical cell. In such embodiments, the electrochemical cell assembly 200 includes a negative active material 206 and a positive active material 212. The negative active material 206 is in the first electrode chamber 218, and the positive active material 212 is in the second electrode chamber 220. The second open circuit electrolyte may be pumped through the second electrode chamber 220 and flowed around and/or through the positive active material 212. In some embodiments, the positive active material 212 is porous and the second open circuit electrolyte is flowed through pores of the positive active material 206 and may also be flowed around the positive active material 206. In such embodiments, the second open circuit electrolyte may be flowed up through, down through, or across through the positive active material 212. In some embodiments, the positive active material 212 is impermeable, and the second open circuit electrolyte may be flowed around the positive active material 212 or a face of the positive active material 212 through the first gap spacer 214.

A second open circuit electrolyte pumping assembly 250 may be used to pump the second open circuit electrolyte through the second electrode chamber 220 of the electrochemical cell assembly 200. The second open circuit electrolyte may enter the second electrode chamber 220 through the second flow inlet 226 and exit the second electrode chamber 220 through the second flow outlet 228. The second open circuit electrolyte may be enter the housing 202 after a prior electrolyte has been completely drained from the second electrode chamber 220 or sequentially as the prior electrolyte is being pumped out of the second electrode chamber 220. Alternatively, the first open circuit electrolyte and the second open circuit electrolyte may be resident in the cell simultaneously, with the second open circuit electrolyte pumped into the second electrode chamber 220 and the first open circuit electrolyte pumped into the first electrode chamber 218.

The second open circuit electrolyte may comprise sulfuric acid or any other suitable electrolyte having an acidic pH (e.g., a pH of <3). In some embodiments, the second open circuit electrolyte may include a plurality of second open circuit additives (e.g., sodium sulfate) and/or dopants (e.g., metals, organic materials, etc.). The second open circuit electrolyte has a second open circuit concentration and may be flowed through the second electrode chamber 220 at a second open circuit flow rate. The second open circuit concentration may be in a range between about 0.05 to 10 M (e.g., 0.05 M, 0.1 M, 0.5 M, 1 M, 2 M, 4 M, 6 M, 8 M, or 10 M, inclusive) and different from the first charge concentration, the second charge concentration, the first discharge concentration, the second discharge concentration, and the first open circuit concentration. The second open circuit concentration may be selected for a non-equilibrium steady state that is maintained by the replenishment of the second open circuit electrolyte from the second open circuit electrolyte reservoir 252. In some embodiments, the second open circuit concentration may be maintained constantly at a steady state concentration while the second open circuit electrolyte is pumped. In such embodiments, the steady state concentration is driven by changing parameters of the second open circuit electrolyte such as stoichiometry.

The second open circuit flow rate may be in a range between about 0.001 to 100 liters/minute/cm$^2$ (e.g., 0.001 liters/minute/cm$^2$, 0.01 liters/minute/cm$^2$, 0.1 liters/minute/cm$^2$, 1 liters/minute/cm$^2$, 10 liters/minute/cm$^2$, 50 liters/minute/cm$^2$, or 100 liters/minute/cm$^2$, inclusive) and different from or equal to the first charge flow rate, the second charge flow rate, the first discharge flow rate, the second discharge flow rate, or the first open circuit flow rate. In some embodiments, flowing the second open circuit electrolyte during the open circuit process for long term storage may result in stripping off buildup on the positive active material 212 (e.g., lead sulfate, lead oxide, etc.). In some embodiments, the second open circuit electrolyte may be used to strip off buildup on the positive active material 212 and may flow during any process of the cell cycle. In some embodiments, the second open circuit electrolyte is optional.

The method 100 includes providing an electrochemical cell with electrodes a negative active material and a positive active material at operation 102. The method 100 continues to operation 104 in which a first electrolyte is pumped through the electrochemical cell, for example, via a pump. In some embodiments, the method 100 continues to operation 106 in which a second charge electrolyte is pumped through the electrochemical cell, for example, via a pump. The second electrolyte may be pumped concomitant with the first charge electrolyte, with the second charge electrolyte associated with the second electrode chamber and the first charge electrolyte associated with the first electrode chamber and separated by the separator. Alternatively, the first charge electrolyte may be removed as the second charge electrolyte is pumped. In some embodiments, operation 106 is optional. The method 100 continues to operation 108 in which a first discharge electrolyte is pumped through the electrochemical cell, for example, via a pump. In some embodiments, the method 100 continues to operation 110 in which a second discharge electrolyte is pumped through the electrochemical cell, for example, via a pump. In some embodiments, operation 110 is optional.

For the purposes of clarify, embodiments using the various electrolytes pumped through the electrochemical cell assembly 200 and possible combinations of where the electrolytes are pumped are shown in Table 1 below.

TABLE 1

| Electrolytes in the electrochemical cell assembly 200. | | |
| --- | --- | --- |
| Electrolyte | Active Material | Electrode Chamber |
| First Charge | Negative and Positive | First and Second |
| First Charge | Negative | First |
| First Charge | Positive | Second |
| Second Charge | Positive | Second |
| First Discharge | Positive and Negative | First and Second |
| First Discharge | Negative | First |
| First Discharge | Positive | Second |
| Second Discharge | Positive | Second |
| First Open Circuit | Negative and Positive | First and Second |
| First Open Circuit | Negative | First |
| First Open Circuit | Positive | Second |
| Second Open Circuit | Positive | Second |

In some embodiments, the electrochemical cell 200 includes a sensing electrode or other types of sensors or a plurality of sensing electrodes configured to monitor the electrolyte concentration of the first charge electrolyte, the second charge electrolyte, the first discharge electrolyte, the second discharge electrolyte, the first open circuit electrolyte, the second open circuit electrolyte, any other electrolyte in the electrochemical cell 200, or any combinations thereof. The plurality of sensing electrodes may be an acoustic sensor, a sensor to detect chemical drift, a sensor to detect electrical drift, or any other suitable sensor.

No claim element herein is to be construed under the provisions of 35 U.S.C. § 112(f), unless the element is expressly recited using the phrase "means for."

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A method, comprising:

providing an electrochemical cell comprising:

a housing, a negative active material disposed within a first electrode chamber of the housing, the negative active material comprising lead and/or lead sulfate, a positive active material disposed within a second electrode chamber of the housing, the positive active material comprising lead, lead sulfate, lead oxide, and/or lead dioxide, and a separator disposed between the first electrode chamber and the second electrode chamber;

pumping a first charge electrolyte from a first reservoir at a first charge flow rate during an electrochemical charge process of a cell cycle of the electrochemical cell through the first electrode chamber so that the first charge electrolyte contacts the negative active material;

pumping a second charge electrolyte during the electrochemical charge process of the cell cycle of the electrochemical cell through the second electrode chamber so that the second charge electrolyte contacts the positive active material;

pumping a first discharge electrolyte from a second reservoir at a first discharge flow rate during an electrochemical discharge process of the cell cycle of the electrochemical cell through the first electrode chamber so that the first discharge electrolyte contacts the negative active material; and pumping a second discharge electrolyte during the electrochemical discharge process of the cell cycle of the electrochemical cell through the second electrode chamber so that the second discharge electrolyte contacts the positive active material;

wherein the first charge electrolyte in the first reservoir has a first concentration, the first discharge electrolyte in the second reservoir has a second concentration and the first concentration is different from the second concentration;

wherein the second charge electrolyte has a third concentration different from the first concentration; and wherein the second discharge electrolyte has a fourth concentration different from the second concentration.

2. The method of claim 1, wherein the first charge electrolyte and the first discharge electrolyte comprise sulfuric acid.

3. The method of claim 1, wherein the first charge concentration and the first discharge concentration are in a range of 0.05 M to 10 M.

4. The method of claim 1, wherein the first charge flow rate and the first discharge flow rate are in a range of 0.001 to 100 liters/minute/cm$^2$.

5. The method of claim 1, wherein the second charge electrolyte comprises sulfuric acid having a concentration in a range of 0.05 M to 10 M.

6. The method of claim 1, wherein the second charge flow rate is in a range of 0.001 to 100 liters/minute/cm$^2$.

7. The method of claim 1, wherein each of the first charge electrolyte, the second charge electrolyte, the first discharge electrolyte, and the second discharge electrolyte comprise sulfuric acid.

\* \* \* \* \*